UNITED STATES PATENT OFFICE.

HENRY MATHEY, OF NEW YORK, N. Y., ASSIGNOR TO JOSE F. NAVARRO, OF SAME PLACE.

MANUFACTURE OF HYDRAULIC CEMENT.

SPECIFICATION forming part of Letters Patent No. 343,183, dated June 8, 1886.

Application filed March 27, 1886. Serial No. 196,844. (No specimens.)

*To all whom it may concern:*

Be it known that I, HENRY MATHEY, a citizen of the United States, residing at New York, in the county of New York, State of New York, have invented certain new and useful Improvements in the Manufacture of Hydraulic Cement, of which the following is a specification.

My invention relates to a method for coloring cement, which will be hereinafter explained.

It is a well-known fact that architects, builders, and contractors, and others using hydraulic cements, prefer and demand a dark-colored cement. One reason is that with a dark-colored cement an excess of sand is at once apparent which does not obtain with cement of a light color.

Many quarries of excellent cement-rock have been abandoned for the reason that when the rock is burned the resulting cement is of a light color, and on account of the existing prejudice it could not be sold at a remunerative price. By my process such rock could profitably be utilized.

By experiments and tests I have found that the addition of a metallic oxide to the cement gives desirable colors. The principal metallic oxide used is oxide of iron, and I find that not only does this give color to the cement, but adds in some degree to the quality of the cement.

The method of treating the oxide and cement is as follows: The iron ore is first crushed fine enough to pass through about a twenty-mesh screen, and is then roasted in a reverberatory furnace or other suitable apparatus in which the admission of air can be well controlled for the transformation of the iron into an oxide. I conduct the operation of roasting so as to stop at the point where the greatest part of the iron is transformed by the excess of air into a protoxide. The material is then discharged and allowed to cool gradually, and protected from contact with the air during the cooling process, thus preventing absorption of one more atom of oxygen and transforming the protoxide into a peroxide. The coloring power of both oxides is great; but the dark oxide (protoxide) gives the most desirable color. The iron is then added in a suitable proportion (from two per cent. to ten per cent., more or less) to the cement before the final pulverization, and they are pulverized together. This trituration diffuses the iron uniformly through the cement and causes it to assume a homogeneous tint. Not only is a desired tint obtained, but I find that the paste of cement sets smoother and quicker and the tensile strength increased. It may be that some clays are rich enough in iron to give the desired color when burned and added to the cement. This may be done without departing from the spirit of my invention. I may of course use other metallic oxides than iron, and obtain other colors. It may be that the oxides used shall be in a greater or less per cent than here stated. This depends on the work to be done—as, for example, plastering, sidewalks, &c.

Having thus described my invention, what I claim, and desire to secure by Letters Patent, is—

1. The process of manufacturing and coloring cement, which consists in adding to the burned cement-rock before final pulverization a metallic oxide which is diffused through the cement during the final grinding or pulverization.

2. The process of manufacturing and coloring cement, which consists in adding to the cement-rock before final pulverization burned clay.

3. The process of manufacturing and coloring cement, which consists in first preparing the cement-rock for final pulverization, next adding thereto a metallic oxide roasted separately from the rock, and finally the rock and oxide together.

In testimony whereof I affix my signature in presence of two witnesses.

HENRY MATHEY.

Witnesses:
JOHN T. ARMS,
W. C. ALVORD.